US006301676B1

(12) United States Patent
Kumar et al.

(10) Patent No.: US 6,301,676 B1
(45) Date of Patent: Oct. 9, 2001

(54) ROBUST AND RECOVERABLE INTERPROCESS LOCKS

(75) Inventors: Aswini S. Kumar, Fremont; Daniel A. Stein, Menlo Park, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/235,881

(22) Filed: Jan. 22, 1999

(51) Int. Cl.[7] ................................ G06F 9/52; G06F 9/54; G06F 11/00
(52) U.S. Cl. ................................ 714/11; 714/15; 710/200; 711/164
(58) Field of Search ........................ 714/11, 15; 710/200; 711/164, 100; 709/102; 707/202

(56) References Cited

U.S. PATENT DOCUMENTS

| 5,136,704 | * | 8/1992 | Danielsen et al. . |
| 5,305,448 | * | 4/1994 | Insalaco et al. . |
| 5,734,817 | * | 3/1998 | Roffe et al. . |

* cited by examiner

Primary Examiner—Gopal C. Ray
(74) Attorney, Agent, or Firm—Park, Vaughan & Fleming LLP

(57) ABSTRACT

One embodiment of the present invention provides a system that supports recovery in the event a previous process holding a lock used for mutual exclusion purposes loses ownership of the lock. This loss of ownership may occur due to the previous process dying or the lock becoming unmapped. Under the present invention a process first attempts to acquire the lock. If the attempt to acquire the lock returns with an error indicating that the previous process holding the lock lost ownership of the lock, the process attempts to make program state protected by the lock consistent. If the attempt to make the program state consistent is successful, the system reinitializes and unlocks the lock. Otherwise, the system marks the lock as unrecoverable so that subsequent processes attempting to acquire the lock are notified that the lock is not recoverable. One aspect of the present invention includes receiving a notification in an operating system that a process died, and determining if the process died while holding a lock. If the process died while holding the lock, the system marks the lock to indicate to subsequent acquirers of the lock that a previous holder of the lock died, and unlocks the lock so that other processes may acquire the lock. According to one aspect of the present invention, if the attempt to acquire the lock returns with an error indicating the lock is not recoverable, the process performs operations to work around the program state that is inconsistent, and reinitializes the lock.

20 Claims, 3 Drawing Sheets

ROBUST AND RECOVERABLE INTERPROCESS LOCKS

COPYRIGHT NOTICE PURSUANT TO 37 C.F.R. §1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to inter-process synchronization mechanisms in computer systems. More specifically, the present invention relates to a method and apparatus for implementing inter-process locks that provides for robust recovery in the event a process fails while holding a lock.

2. Related Art

Computer systems often support multiple processes that can work together on a single computational task. One of the challenges in using multiple processes is to synchronize the processes so that they do not interfere with each other. This is typically accomplished through mutual exclusion locks (mutex locks), which are used to ensure that only one process at a time performs a particular task or has access to specific items of shared data.

A process typically attempts to "acquire" a lock before executing a critical section of code or accessing specific items of shared data. If no other process presently holds the lock, the process acquires the lock by setting the lock to a locked state. After acquiring the lock, the process is free to execute the critical section of code or manipulate the items of shared data without interference from other processes. While the process holds the lock, other processes attempting to acquire the lock will "block" waiting for the lock, and will not be able to proceed until the lock is released. After the process completes the task, it releases the lock, thereby allowing other processes to acquire the lock.

Mutual exclusion locks create complications for computer systems that operate robustly. Such "robust" computer systems are designed to continue processing even if some of the processes or processors involved in a computational task fail during program execution. If a process fails while holding a mutual exclusion lock, other processes attempting to acquire the lock will "hang," waiting for the failed process to release the lock. The computational task will consequently come to a halt.

To remedy this problem, some computer systems simply release a lock if a process holding the lock fails. This allows other processes that are blocked on the lock to continue processing. However, the process that failed may have left the data protected by the lock in an inconsistent state. This may cause the remaining processes to produce an incorrect result or to fail at some time in the future.

Other systems notify the remaining processes that the state protected by the lock was left in an inconsistent state when the process died. This allows the remaining processes to take action to make the state consistent again. However, the remaining processes may not be successful in making the state consistent again. In this case, the remaining processes will ultimately produce an incorrect result or will fail at some time in the future.

What is needed is a method or an apparatus that provides robust recoverable locks that do not let other processes hang if a process holding a lock fails, and which allows the other processes to restore the state protected by the lock to a consistent state.

SUMMARY

One embodiment of the present invention provides a system that supports recovery in the event a previous process holding a lock used for mutual exclusion purposes loses ownership of the lock. This loss of ownership may occur due to the previous process dying or the lock becoming unmapped. Under the present invention a process first attempts to acquire the lock. If the attempt to acquire the lock returns with an error indicating that the previous process holding the lock lost ownership of the lock, the process attempts to make program state protected by the lock consistent. If the attempt to make the program state consistent is successful, the system reinitializes and unlocks the lock. Otherwise, the system marks the lock as unrecoverable so that subsequent processes attempting to acquire the lock are notified that the lock is not recoverable.

One aspect of the present invention includes receiving a notification in an operating system that a process died, and determining if the process died while holding a lock. If the process died while holding the lock, the system marks the lock to indicate to subsequent acquirers of the lock that a previous holder of the lock died, and unlocks the lock so that other processes may acquire the lock.

According to one aspect of the present invention, if the attempt to acquire the lock returns with an error indicating the lock is not recoverable, the process performs operations to work around the program state that is inconsistent, and reinitializes the lock.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may originate from a communications network, such as the Internet.

Computer System

Figure 1:
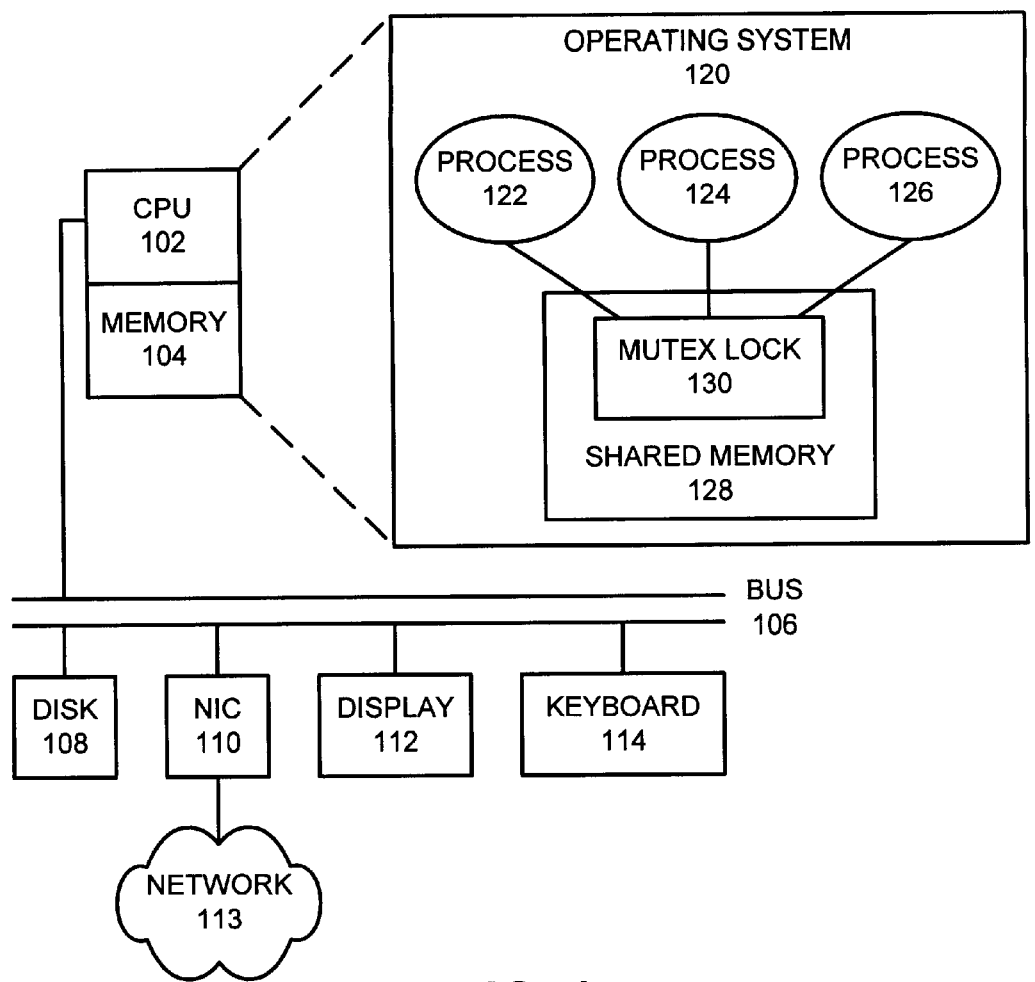
FIG. 1 illustrates a computer system that is able to execute multiple processes in accordance with an embodiment of the present invention.

FIG. 1 illustrates a computer system that is able to execute multiple processes in accordance with an embodiment of the present invention. The system includes central processing unit (CPU) 102, which is coupled to memory 104. CPU 102 may include any type of computing device that is capable of processing code and/or data. This includes, but is not limited to, a mainframe processor, a multi-processor, a microprocessor, a device controller, and a computational unit within an appliance. Memory 104 includes any type of random access memory that can be used to store code and/or data for execution by CPU 102. Note that CPU 102 may be coupled to memory 104 in a number of ways, including through a dedicated processor-to-memory bus, through a system bus or through an intervening core logic unit.

CPU 102 is additionally coupled to a number of other peripherals through bus 106. These peripherals include disk 108, network interface controller (NIC) 110, display 112 and keyboard 114. Disk 108 refers to any type of secondary storage device, including a magnetic or optical disk drive or a tape drive. NIC 110 includes circuitry for coupling the computer system to a computer network 113. Network 113 may be any type of network or collection of networks that can be used to couple together computer systems, such as a local area network and/or a wide area network. Display 112 may be any output device for the computer system, including a computer monitor for graphical images or an audio output device, for audio data Keyboard 114 may include any type of device for receiving input into a computer system. This includes, but is not limited to, a computer keyboard and a computer mouse.

Note that although a particular implementation of a computer system is illustrated in FIG. 1, the present invention applies generally to all computer systems that can run multiple processes, including computer systems with multiple processors.

FIG. 1 additionally illustrates operating system 120, which facilitates execution of a collection of processes, including processes 122, 124 and 126. Processes 122, 124 and 126 may be any type of processes that are commonly executed by a computer system, including lightweight processes and heavyweight processes, as well as system processes and user processes.

Processes 122, 124 and 126 access shared memory 128, which may be a region of share semiconductor memory 104, or alternatively a shared file. Shared memory 128 includes mutex lock 130, which is mutual exclusion lock used by processes 122, 124 and 126 for providing exclusive access to a critical section of code or to items of shared data in memory 104.

Operating System

Figure 2:
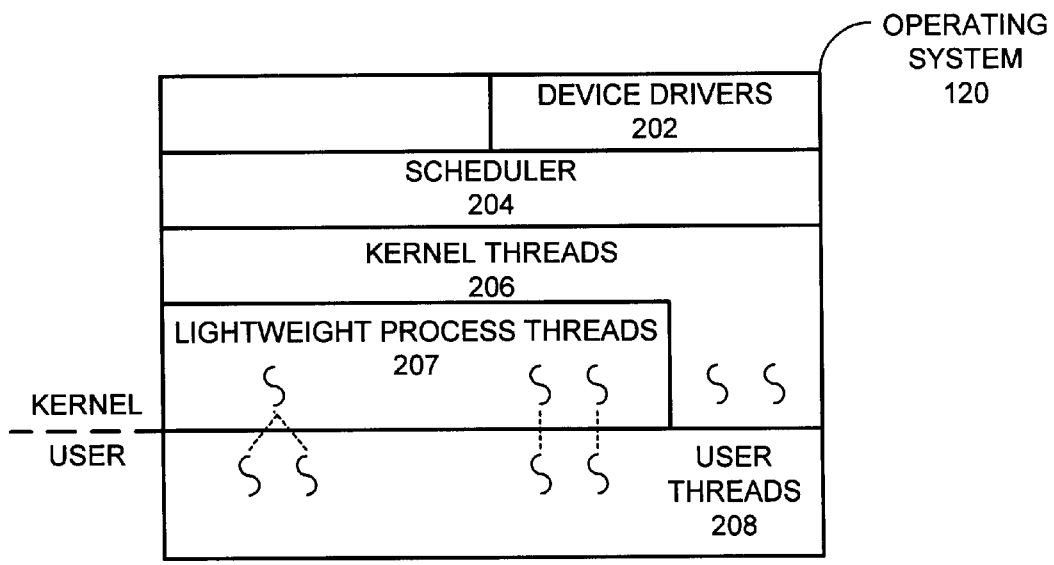
FIG. 2 illustrates part of the internal structure of an operating system in accordance with an embodiment of the present invention.

FIG. 2 illustrates part of the internal structure of operating system 120 in accordance with an embodiment of the present invention. Operating system 120 includes a number of layers and functional modules, including user threads layer 208, kernel threads layer 206, scheduler 204 and device driver 202. Device driver 202 includes device drivers for operating devices attached to the computer system. For example, device driver 202 may include a device driver for accessing disk 108 and a device driver for accessing NIC 110.

Scheduler 204 includes resources for scheduling threads and or processes for execution on one or more central processing units. Scheduler 204 manipulates both kernel threads 206 and user threads 208. Kernel threads 206 include kernel-level threads that operate entirely on operating system functions inside of operating system 120, as well as lightweight process threads 207 that are associated with user threads 208. User threads 208 are used to execute user programs. In the embodiment illustrated in FIG. 2, multiple user threads 208 can be mapped onto a single lightweight process thread 207.

Note that although a particular operating system structure is outlined in FIG. 2, the present invention applies to any operating system that allows multiple processes to work together on a single computational task.

Data Structures

Figure 3:
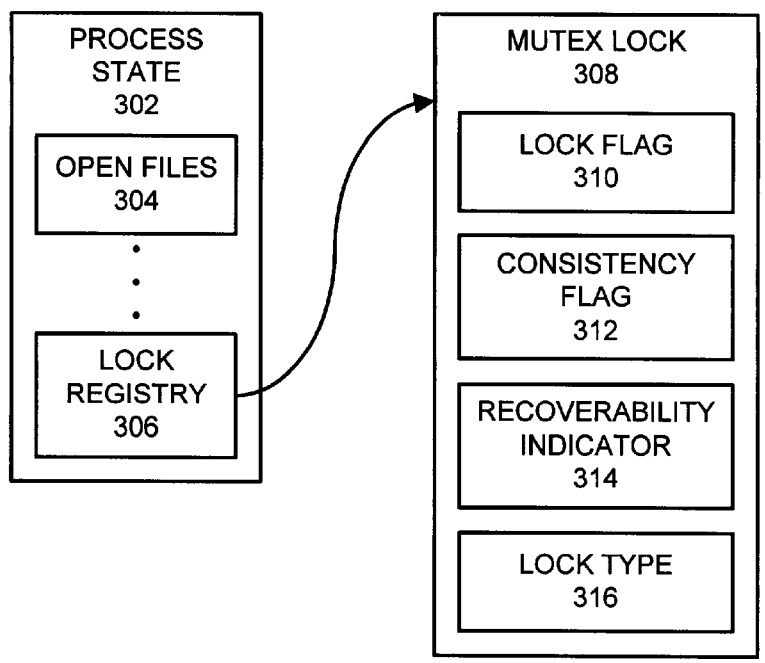
FIG. 3 illustrates some of the data structures involved in implementing robust locks in accordance with an embodiment of the present invention.

FIG. 3 illustrates some of the data structures involved in implementing robust locks in accordance with an embodiment of the present invention. This embodiment illustrates process state 302, which contains state associated with a process that has access to mutex lock 308, such as process 122 from FIG. 1. Process state 302 includes state associated with process 122. This state is stored in a data structure (or data object) within operating system 120. For example, process state 302 includes a list of open files 304 for the process. Also included in process state 302 is lock registry 306, which includes a list of locks that may be in use by process 122. For example, in FIG. 3, lock registry 306 contains a pointer to mutex lock 308.

Lock registry 306 allows operating system 120 to determine if process 122 died while holding a lock. After a mutex lock 308 is initialized, it is registered in the lock registry 306 of any processes that desires to have access to mutex lock 308. For example, mutex lock 308 may be registered in lock registry 306 for process 122. This allows the operating system to determine and identify any locks that process 122 holds when and if process 122 dies. Note that lock registry 306 may alternatively reside outside of process state 302 in a separate lock registry table that is indexed by process identifier.

Mutex lock 308 contains state associated with a lock. This state includes lock flag 310, consistency flag 312, recoverability indicator 314 and lock type indicator 316. Lock flag 310 includes a byte or word of data indicating whether or not mutex lock 308 is locked. While mutex lock 308 is held by a process, lock flag 310 is set to a locked state so that other processes cannot acquire mutex lock 308. Consistency flag 312 indicates whether or not the program state protected by mutex lock 308 is consistent. Recoverability indicator 314 indicates whether or not the process state protected by mutex lock 308 is recoverable after a process holding mutex lock 308 dies. Finally, lock type indicator 316 indicates what type of lock mutex lock 308 is. For example, lock type indicator 316 may indicate whether mutex lock 308 is a robust lock or a non-robust lock.

Operation of Robust Locks

Figure 4:
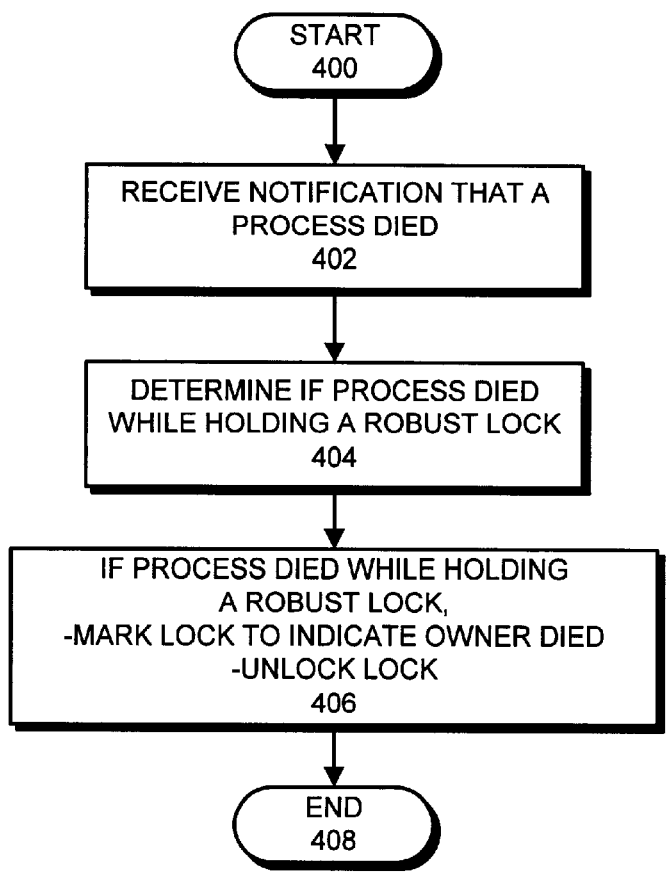
FIG. 4 is a flow chart illustrating how an operating system handles a process that dies while holding a lock in accordance with an embodiment of the present invention.

FIG. 4 is a flow chart illustrating how an operating system handles a process that dies while holding a mutex lock 308 in accordance with an embodiment of the present invention.

In the illustrated flow chart, operating system 120 first receives a notification that a process 122 died (step 402). Operating system 120 examines a lock registry 306 within process state 302 to determine if process 122 died while holding mutex lock 308 (step 404). If so, operating system 120 marks the mutex lock 308 to indicate that a previous process died while holding mutex lock 308, and then unlocks mutex lock 308 by unmarking lock flag 310 in FIG. 3. This allows a subsequent process to grab mutex lock 308 and to determine that process 122 died while holding mutex lock 308.

Note that operating system 120 may indicate that a previous process died while holding mutex lock 308 by setting consistency flag 312 in FIG. 3 to an inconsistent state. Alternatively, consistency flag 312 may be set by a process that has acquired mutex lock 308 prior modifying the state protected by mutex lock 308. After this process has finished modifying the state protected by mutex lock 308, it unsets consistency flag 312.

Figure 5:
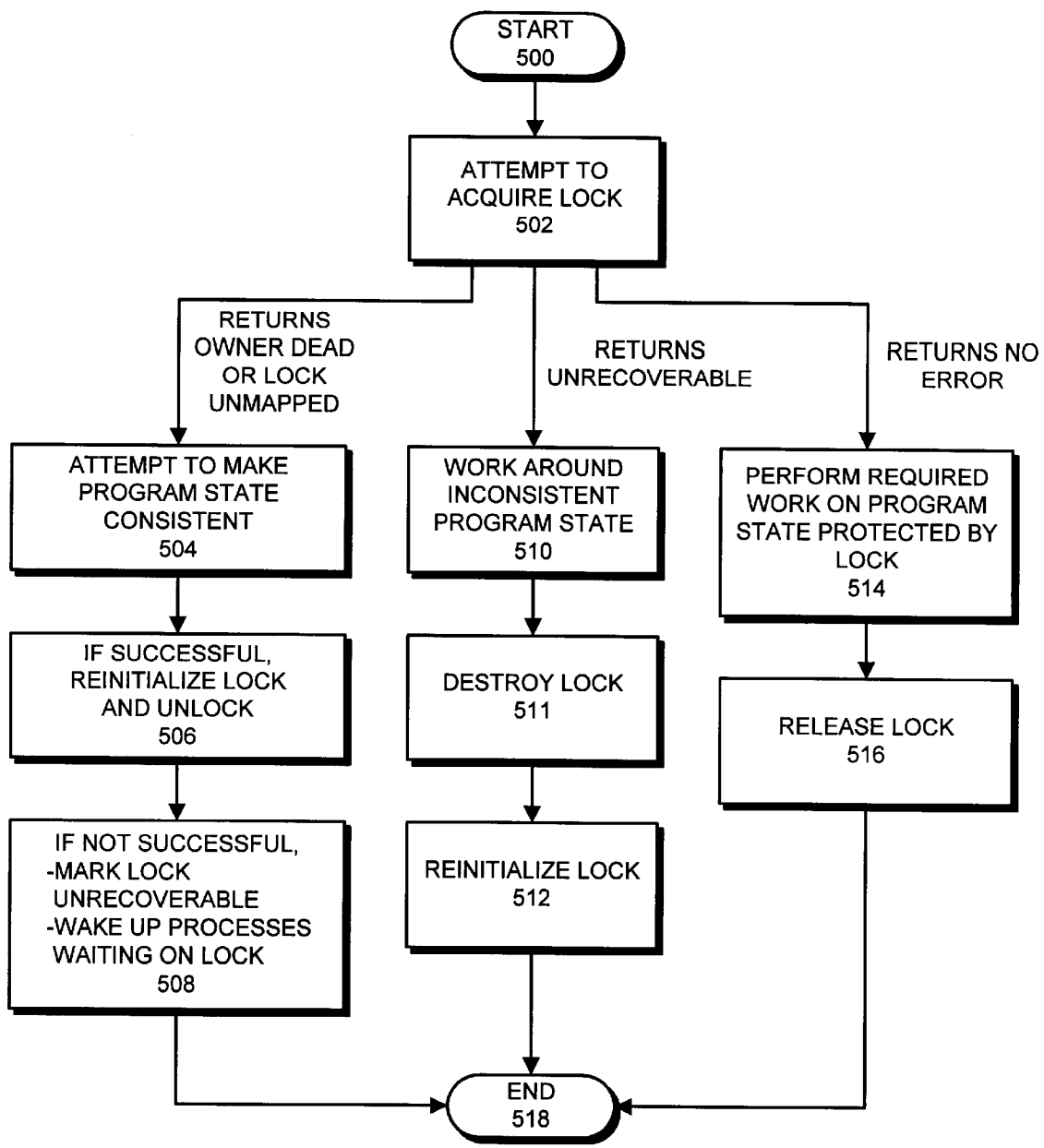
FIG. 5 is a flow chart illustrating how a robust lock is used in accordance with an embodiment of the present invention.

FIG. 5 is a flow chart illustrating how a robust lock is used in accordance with an embodiment of the present invention. First, a process, such as process 122 from FIG. 1, makes a function call in an attempt to acquire a lock, such as mutex lock 308 from FIG. 3 (step 502). The function call examines lock flag 310 to determine if another process presently holds mutex lock 308. If another process currently holds mutex lock 308, process 122 blocks on mutex lock 308. When the other process ultimately releases mutex lock 308, process 122 acquires mutex lock 308 by marking lock flag 310 and the function call returns.

If the function call returns with no error value, the system performs the required work on the program state protected by the mutex lock 308 (step 514). After the required work is performed, the system releases mutex lock 308 by unmarking lock flag 310 so that another process can acquire mutex lock 308.

If the function call returns marked either "owner dead" or "lock unmapped," the process knows that another process holding mutex lock 308 either died or became disassociated from mutex lock 308, and that the program state protected by mutex lock 308 may be in an inconsistent state. In this case, process 122 attempts to make the program state protected by mutex lock 308 consistent (step 504). If process 122 is able the make the program state consistent, it re-initializes mutex lock 308 and then unlocks mutex lock 308 (step 506). If process 122 is not successful in making the program state consistent, it marks mutex lock 308 as unrecoverable (by setting recoverability indicator 314 in FIG. 3) so that subsequent processes will know that process 122 failed to make the program state consistent (step 508). Process 122 will additionally unmark lock flag 310 to unlock mutex lock 308. This allows other processes to acquire mutex lock 308. Process 122 may also wake up processes that are waiting on mutex lock 308.

If the function call returns marked "unrecoverable" (i.e., recoverability indicator 314 from FIG. 3 is marked), process 122 knows that a previous process has already attempted to make the program state protected by mutex lock 308 consistent. Process 122 attempts to work around the inconsistent program state by, for example, repeating program operations that were required to produce the program state to begin with, or alternatively by restarting the program from the beginning (step 510). When this task is complete, process 122 destroys mutex lock 308 (step 512) and reinitializes mutex lock 308 so that another process can acquire mutex lock 308 (step 512).

Example of Using Robust Lock

Tables 1A and 1B present an example in the C programming language of how one embodiment of robust locks is used. The first portion of the main program (in Table 1A) initializes the mutex lock. The second portion of the main program (in Table 1B) includes a loop that cycles through a "switch" statement. This switch statement handles the three cases of "owner dead," "not recoverable" and "no error," which correspond to the three-way branch in the flow chart of FIG. 5.

TABLE 1A

```
/* Copyright ® 1998 SUN Microsystems, Inc. All Rights Reserved */
/* cc thisfile.c -lthread */
/* To execute, run the command line "a.out & a.out 1" */
#include <sys/types.h>
#include <sys/mman.h>
#include <fcntl.h>
#include <stdio.h>
#include <thread.h>
#define INTERPROCESS_FILE "ipc-sharedfile"
typedef struct {
        mutex_t Interprocess_mutex;
        int     Interprocess_data;
} buffer_t;
buffer_t *buffer;
int make_date_consistent( );
void create_shared_memory( );
int zeroed[sizeof(buffer_t)];
int ipc_fd, i=0;
main(int argc, char *argv[]) {
    int rc;
    if (argc > 1) {
        while((ipc_fd = open(INTERPROCESS_FILE,
           O_RDWR)) == -1)
            sleep(1);
        buffer = (buffer_t*) mmap(NULL, sizeof(buffer_t),
            PROT_READ[PROT_WRITE, MAP_SHARED,
            ipc_fd, 0);
        mutex_init(&buffer->Interprocess-mutex,
            USYNC_PROCESS_ROBUST, 0);
    } else {
        create_shared_memory();
        ipc_fd = open(INTERPROCESS_FILE, O_RDWR);
        buffer = (buffer_t *) mmap(NULL, sizeof(buffer_t),
            PROT_READ | PROT_WRITE, MAP_SHARED,
            ipc_fd, 0);
        buffer->Interprocess_data = 0;
        mutex_init(&buffer->Interprocess_mutex,
            USYNC_PROCESS_ROBUTS, 0);
    }
```

TABLE 1B

```
/* Copyright ® 1998 SUN Microsystems, Inc. All Rights Reserved */
        for(;;) {
            rc = mutex_lock (&buffer->Interprocess_mutex);
            switch (rc) {
            case EOWNERDEAD:
                /*lock acquired.
                 *   last owner died holding the lock, try
                 *   to make the state associated with the
                 *   mutex consistent.
                 *   if so, make the robust lock consistent
                 *   by re-initializing it.
                 */
                if (make_data_consistent( ))
                mutex_init
                    (&buffer->Inpterprocess_mutex,
                      USYNC_PROCESS ROBUST, 0);
                mutex_unlock
                    (&buffer->Interprocess_mutex);
            case ENOTRECOVERABLE:
                /*Lock not acquired.
                 *   last owner got the mutex with
```

TABLE 1B-continued

```
                *    EOWNERDEAD mutex is not con-
                *    sistent (and data?), so return.
                */
                exit(1);
                break;
            case 0:
                /*   no error - data is consistent */
                /*   do something with data */
                mutex_unlock
                (&buffer->Interprocess_mutex);
                break;
        }
    }
}       /* end main */
void create_shared_memory( ) {
    int i;
    ipc_fd =
    creat(INTERPROCESS_FILE,
    O_CREAT | O_RDWR);
    for (i=0; i<sizeof(buffer_t); i++) {
        zeroed[i] = 0;
        write(ipc_fd, &zeroed[i], 2);
    }
    close(ipc_fd);
    chmod(INTERPROCESS_FILE,
    S_IRWXU | S_IRWXG | S_IRWXO);
/* return 1 if able to make data consistent, otherwise 0 */
int make-data consistent ( ) {
    buffer->Interprocess_data = 0;
    return (1);
}
```

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for providing robust recovery in the event a previous process holding a lock used for mutual exclusion purposes loses ownership of the lock, the loss of ownership occurring due to the previous process dying or the lock becoming unmapped, the method comprising:

making an attempt to acquire the lock; and if the attempt to acquire the lock returns with an error indicating that the previous process holding the lock lost ownership of the lock, attempting to make program state protected by the lock consistent, if the attempt to make the program state consistent is successful, reinitializing the lock and unlocking the lock, and if the attempt to make the program state consistent is not successful, marking the lock as unrecoverable so that subsequent processes attempting to acquire the lock receive an error indicating the lock is not recoverable.

2. The method of claim 1, further comprising if the attempt to acquire the lock returns without an error condition:

manipulating the program state protected by the lock, and releasing the lock.

3. The method of claim 1, further comprising:

receiving a notification in an operating system that a process died;

determining if the process died while holding a lock; and if the process died while holding the lock, marking the lock to indicate to subsequent acquirers of the lock that a previous holder of the lock died, and unlocking the lock so that other processes may acquire the lock.

4. The method of claim 1, further comprising if the attempt to acquire the lock returns with an error indicating the lock is not recoverable, performing operations to work around the program state that is inconsistent, and reinitializing the lock.

5. The method of claim 1, wherein the act of marking the lock as unrecoverable further comprises waking up processes waiting on the lock, so that the processes waiting on the lock will subsequently attempt to acquire the lock and will receive the error indicating the lock is not recoverable.

6. The method of claim 1, wherein the lock resides in a memory that is shared by a plurality of processes.

7. The method of claim 1, wherein the lock resides in a file that is shared by a plurality of processes.

8. The method of claim 1, wherein the lock resides in a location that can be directly accessed by a plurality of processes without performing an operating system call.

9. A method for providing robust recovery in the event a previous process holding a lock used for mutual exclusion purposes loses ownership of the lock, the loss of ownership occurring due to the previous process dying or the lock becoming unmapped, the method comprising:

receiving a notification in an operating system that a process died;

determining if the process died while holding the lock;

if the process died while holding the lock, marking the lock to indicate to subsequent acquirers of the lock that a previous holder of the lock lost ownership of the lock, and unlocking the lock so that other processes may acquire the lock;

making an attempt to acquire the lock;

if the attempt to acquire the lock returns with an error indicating that the previous process holding the lock lost ownership of the lock, attempting to make program state protected by the lock consistent, if the attempt to make the program state consistent is successful, reinitializing the lock and unlocking the lock, and if the attempt to make the program state consistent is not successful, marking the lock as unrecoverable so that subsequent processes attempting to acquire the lock receive an error indicating the lock is not recoverable; and if the attempt to acquire the lock returns without an error condition, manipulating the program state protected by the lock, and releasing the lock.

10. The method of claim 9, further comprising if the attempt to acquire the lock returns with an error indicating the lock is not recoverable, performing operations to work around the program state that is inconsistent, and reinitializing the lock.

11. The method of claim 9, wherein the act of marking the lock as unrecoverable further comprises waking up processes waiting on the lock, so that the processes waiting on the lock will subsequently attempt to acquire the lock, and will receive the error indicating the lock is not recoverable.

12. The method of claim 9, wherein the lock resides in a location that can be directly accessed by a plurality of processes without performing an operating system call.

13. A computer readable storage medium storing instructions that when executed by a computer cause the computer to perform a method for providing robust recovery in the event a previous process holding a lock used for mutual exclusion purposes loses ownership of the lock, the loss of ownership occurring due to the previous process dying or the lock becoming unmapped, the method comprising:

making an attempt to acquire the lock;
   if the attempt to acquire the lock returns with an error indicating that the previous process holding the lock lost ownership of the lock,
      attempting to make program state protected by the lock consistent,
      if the attempt to make the program state consistent is successful, reinitializing the lock and unlocking the lock,
      if the attempt to make the program state consistent is not successful, marking the lock as unrecoverable so that subsequent processes attempting to acquire the lock receive an error indicating the lock is not recoverable.

14. An apparatus for providing robust recovery in the event a previous process holding a lock used for mutual exclusion purposes loses ownership of the lock, the loss of ownership occurring due to the previous process dying or the lock becoming unmapped, the apparatus comprising:

a lock acquiring mechanism that makes an attempt to acquire the lock;
   a consistency recovery mechanism that attempts to make program state protected by the lock consistent if the attempt to acquire the lock returns with an error indicating that the previous process holding the lock lost ownership of the lock;
   a lock re-initialization mechanism that reinitializes the lock and unlocks the lock if the attempt to make the program state consistent is successful; and
   a first lock marking mechanism that marks the lock as unrecoverable if the attempt to make the program state consistent is not successful, so that subsequent processes attempting to acquire the lock receive an error indicating the lock is not recoverable.

15. The apparatus of claim 14, further comprising a second lock marking mechanism within an operating system, wherein upon receiving a notification that a process died, the second lock marking mechanism determines if the process died while holding a lock, and if the process died while holding the lock, marks the lock to indicate to subsequent acquirers of the lock that a previous holder of the lock died, and unlocks the lock so that other processes may acquire the lock.

16. The apparatus of claim 14, further comprising a program recovery mechanism, wherein in the case where the attempt to acquire the lock returns with an error indicating the lock is not recoverable, the program recovery mechanism
   performs operations to work around the program state that is inconsistent, and
   reinitializes the lock.

17. The apparatus of claim 14, wherein the lock resides in a location that can be directly accessed by a plurality of processes without performing an operating system call.

18. A computer readable storage medium containing a lock data structure that facilitates providing robust recovery in the event a previous process holding the lock loses ownership of the lock, the loss of ownership occurring due to the previous process dying or the lock becoming unmapped, the data structure comprising:

a lock flag indicating whether the lock is locked; and
   a recoverability indicator indicating that a second process was unable to make program state protected by the lock consistent after a first process holding the lock lost ownership of the lock.

19. The computer readable storage medium containing a lock data structure of claim 18, including a flag indicating whether the program state protected by the lock is in a consistent state.

20. The computer readable storage medium containing a lock data structure of claim 18, including a lock type indicator indicating whether the lock is a robust lock that includes a recoverability indicator.

* * * * *